US011663837B2

(12) United States Patent
Aiello et al.

(10) Patent No.: US 11,663,837 B2
(45) Date of Patent: May 30, 2023

(54) METER TEXT DETECTION AND RECOGNITION

(71) Applicant: Itron, Inc., Liberty Lake, WA (US)

(72) Inventors: Roberto Aiello, Bend, OR (US); John Boik, Houston, TX (US)

(73) Assignee: Itron, Inc., Liberty Lake, WA (US)

( * ) Notice: Subject to any disclaimer, the term of this patent is extended or adjusted under 35 U.S.C. 154(b) by 0 days.

(21) Appl. No.: 17/139,645

(22) Filed: Dec. 31, 2020

(65) Prior Publication Data

US 2022/0207280 A1 Jun. 30, 2022

(51) Int. Cl.
*G06K 9/32* (2006.01)
*G06Q 50/06* (2012.01)
(Continued)

(52) U.S. Cl.
CPC .............. *G06V 20/62* (2022.01); *G06Q 50/06* (2013.01); *G06V 10/242* (2022.01); *G01D 4/00* (2013.01); *G06N 3/04* (2013.01)

(58) Field of Classification Search
CPC .. G06V 20/62; G06V 10/242; G06V 30/1463; G06K 9/00; G06K 9/00496; G06K 9/0051; G06Q 50/06; G01D 4/00; G07B 13/00; G07F 17/0014; G07F 17/0021; G06N 3/04; G06N 3/02; G06N 7/02
See application file for complete search history.

(56) References Cited

U.S. PATENT DOCUMENTS 7,436,979 B2 10/2008 Bruce et al.
10,846,561 B1 * 11/2020 Floerkemeier ....... G06K 7/1417
(Continued)

FOREIGN PATENT DOCUMENTS

WO WO-2013136295 A1 * 9/2013 ............. G01D 4/008
WO WO-2018101419 A1 * 6/2018 ............. G01R 22/06

OTHER PUBLICATIONS

Mobile Utility Meter Reading—Scan Utility Meters with Any Mobile | Anyline; printed from https://anyline.com/products/ocr-meter-reading/; 11 pages, Sep. 21, 2020.
(Continued)

*Primary Examiner* — Bobbak Safaipour
*Assistant Examiner* — Duy Tran
(74) *Attorney, Agent, or Firm* — Lee & Hayes, P.C.

(57) ABSTRACT

Techniques for meter text detection and recognition are described herein. In an example, an application receives a first image, depicting information displayed by the meter, from an imaging device. One or more qualities of the first image may be assessed, such as focus or lighting. A setting of the imaging device may be adjusted. The adjusting may be based at least in part on the assessed quality of the first image and one or more characteristics of an optical character recognition (OCR) algorithm. Accordingly, the settings of the image-capture device are tuned to the needs of the OCR algorithm. A second image may be captured, depicting information displayed by the meter, using the imaging device adjusted according to the adjusted setting. The OCR algorithm may be applied to the second image to obtain an alphanumeric value associated with the second image. The alphanumeric value is obtained from the OCR algorithm.

14 Claims, 11 Drawing Sheets

(51) Int. Cl.
  *G06V 20/62* (2022.01)
  *G06V 10/24* (2022.01)
  G06N 3/04 (2023.01)
  G01D 4/00 (2006.01)

(56) References Cited

U.S. PATENT DOCUMENTS

| | | | | |
|---|---|---|---|---|
| 2008/0008383 A1* | 1/2008 | Andel | ............ | G06K 9/00 |
| | | | | 382/173 |
| 2008/0218164 A1* | 9/2008 | Sanderford | ............ | G01D 4/008 |
| | | | | 702/62 |
| 2012/0150745 A1* | 6/2012 | Csulits | ............ | G06Q 20/042 |
| | | | | 705/45 |
| 2015/0006360 A1* | 1/2015 | Kumar | ............ | G06Q 20/4016 |
| | | | | 705/39 |
| 2015/0009542 A1* | 1/2015 | Zhao | ............ | G06V 10/98 |
| | | | | 358/462 |
| 2015/0341370 A1* | 11/2015 | Khan | ............ | H04L 63/20 |
| | | | | 726/30 |

OTHER PUBLICATIONS

Elrefaei, et al; Automatic Electricity Meter Reading Based on Image Processing; 2015 IEEE Jordan Conference on Applied Electrical Engineering and Computing Technologies (AEECT); 5 pages.
Kompf, OpenCV practice OCR for the electricity meter; retrieved from https://www.mkompf.com/cplus/emeocv.html on Sep. 21, 2020; 17 pages.

* cited by examiner

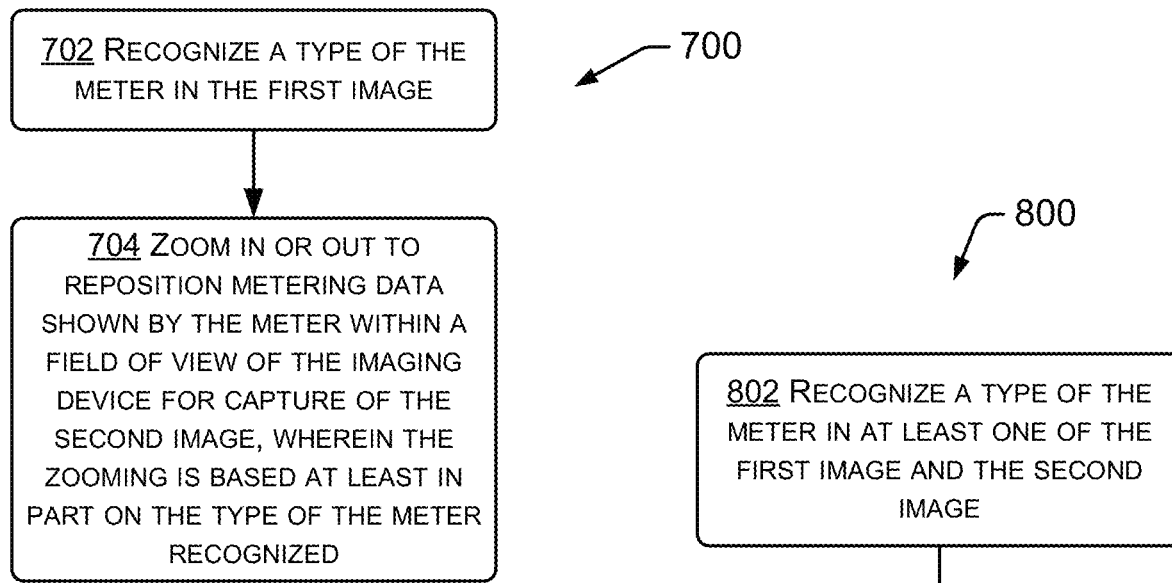
FIG. 7
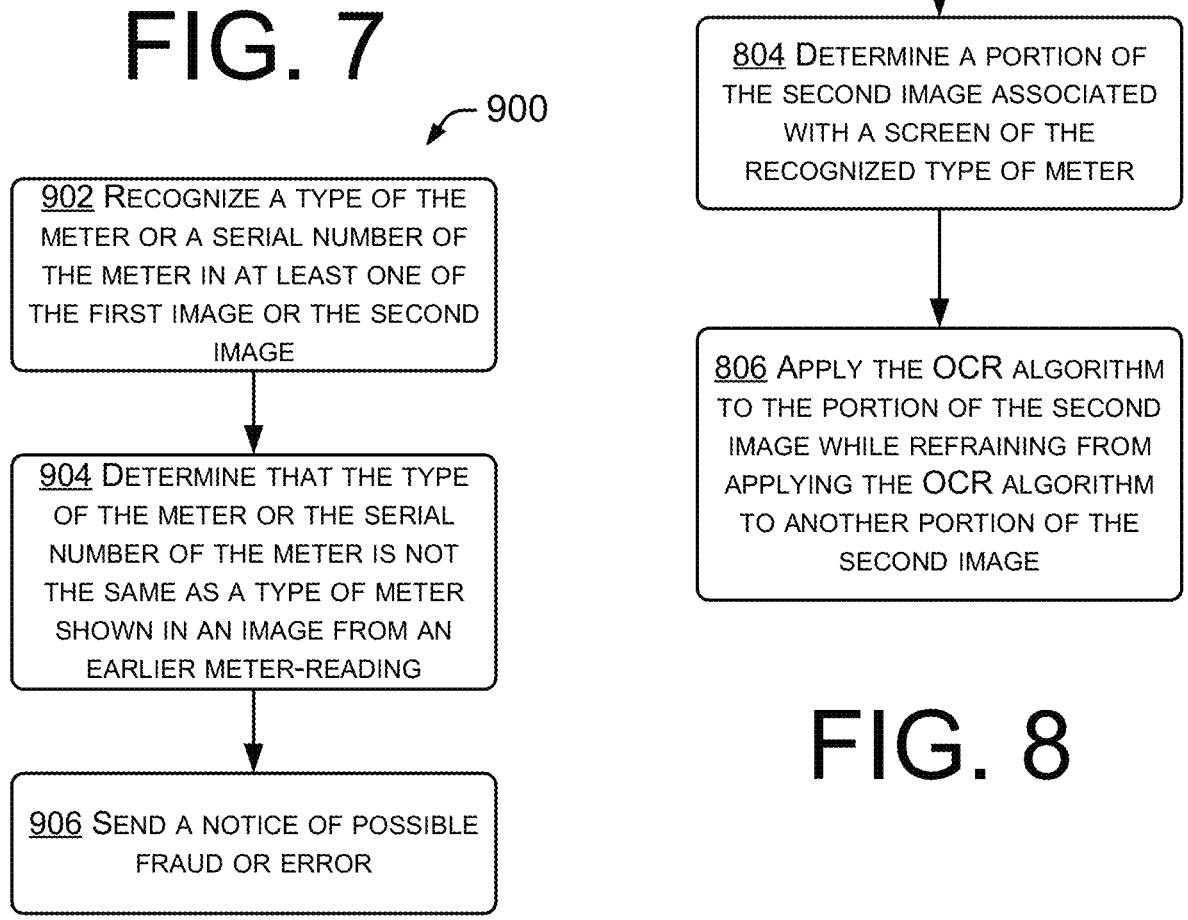
FIG. 8
FIG. 9

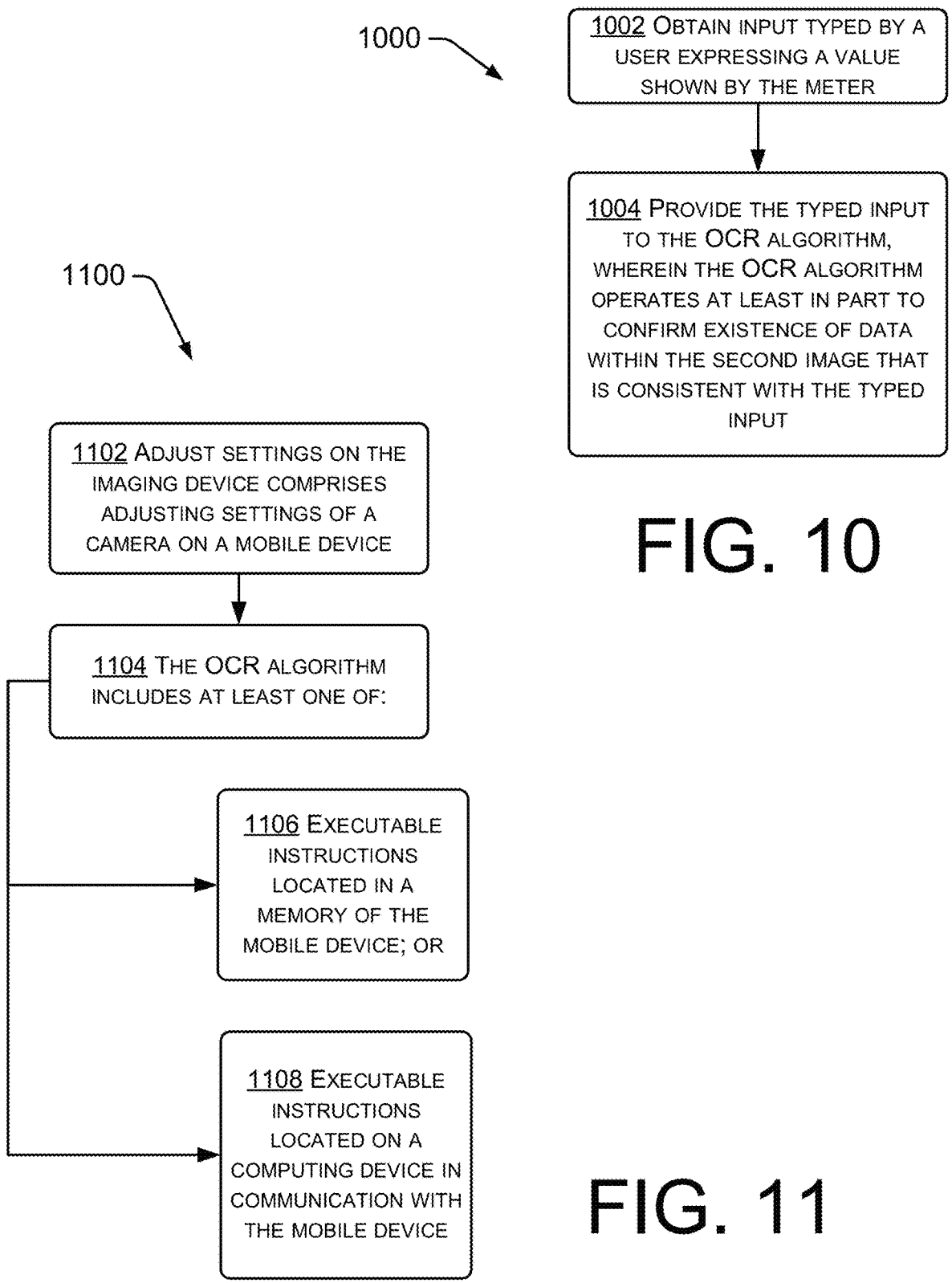

METER TEXT DETECTION AND RECOGNITION

BACKGROUND

In some areas, the customers of utility companies read their own electricity, gas and/or water meters and report the readings to the utility company. In other areas, professional meter-readers are employed. However, in both situations there are issues of fraud and accuracy. Accordingly, improved techniques would be welcomed by the industry.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. Moreover, the figures are intended to illustrate general concepts, and not to indicate required and/or necessary elements.

FIG. 7 is a flowchart showing an example method for recognizing a meter make and/or model in a captured image, and "zooming" in on relevant portions of the image.

FIG. 8 is a flowchart showing an example method for recognizing relevant portions of an image of a meter and applying an OCR algorithm to those portions.

FIG. 9 is a flowchart showing an example method recognizing a make/model of a meter, a serial number of a meter, etc. and determining possible fraud, perhaps based on earlier-performed meter-reading(s).

FIG. 10 is a flowchart showing an example method for obtaining user input and providing the input to an OCR algorithm (e.g., program or application).

FIG. 11 shows modifications that may be applied to appropriate methods.

DETAILED DESCRIPTION

Overview

Figure 1:
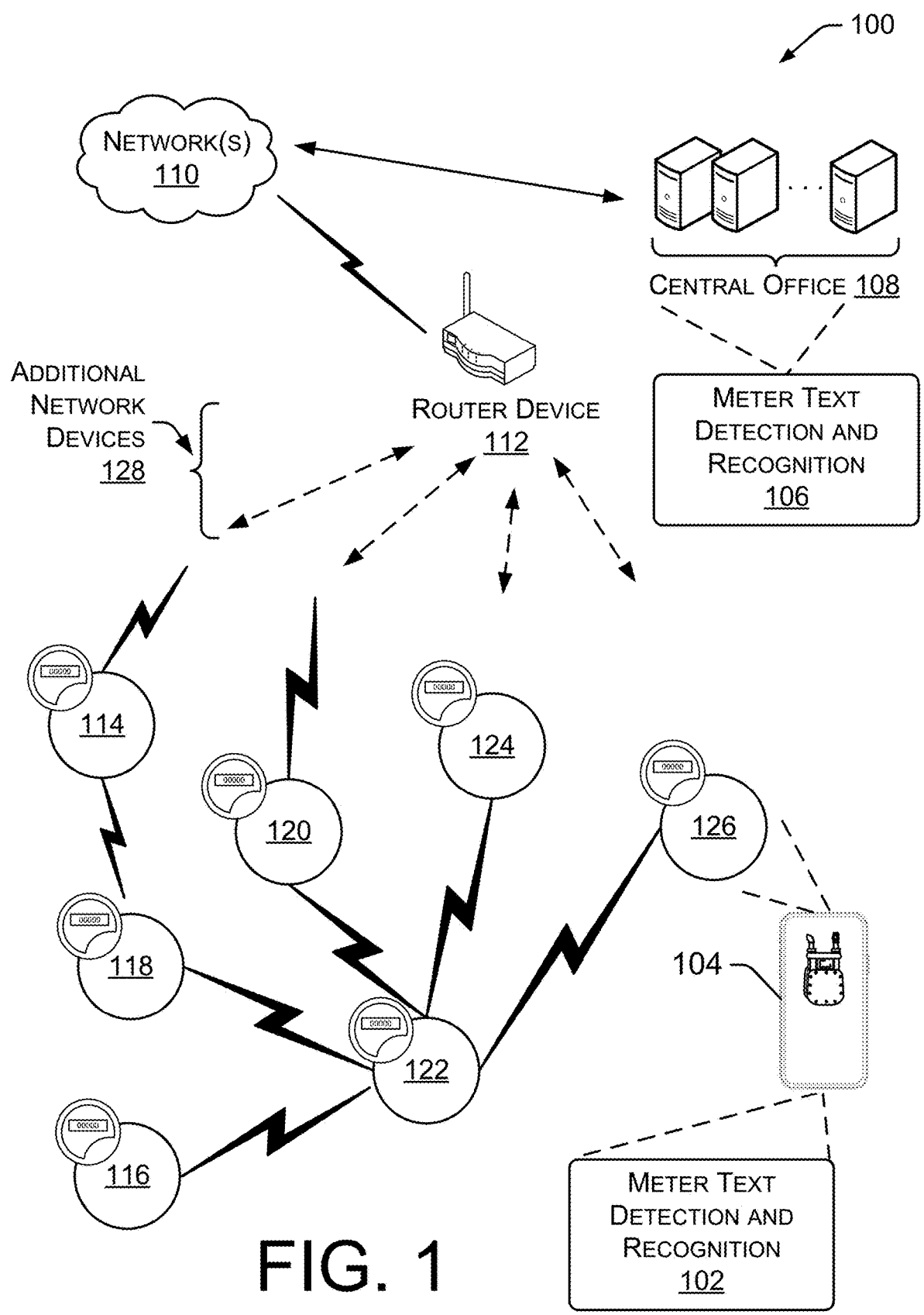
FIG. 1 is a block diagram, showing a utility network having a meter text detection and recognition system.

In a utility company and utility customer environment, scene text detection and recognition (STDR), also known as optical character recognition (OCR), especially when applied to an image of text, may be applied to customer-read or professional meter-reader generated images of utility meters. In an example, a user takes a picture (hereinafter, a picture can be a "still" image or a video, or a data file of such images) of a utility meter with a smartphone camera. A mathematical or other model (e.g., software application) inside the phone or in a remote cloud location detects the area of interest in the image that contains meter numbers or other target information. The model converts the information in that sub-image (e.g., the "dials" or screen output displayed by the meter) into a string of alphanumeric values (e.g., four to eight numerals, etc.).

The techniques described herein address aspects of image quality, image-capture device settings, algorithm operation, and/or techniques for meter text detection and text recognition. In an example, the techniques assess light, glare, angle, focus, and/or other camera and image parameters, and also potentially assess image content, prior to STDR. This is done through a series of algorithmic steps and/or trained mathematical models (perhaps involving neural network or other methods). This pre-OCR/STDR step may guide the user in real time via sounds and/or screen icons that change light and/or shape. This user interface informs the user when conditions for image capture are suitable. Alternatively, the pre-STDR step can directly adjust the camera settings. Outputs of the pre-STDR step can be confidence values and/or values that summarize ambient conditions. Other output values can summarize quality of image content, including whether the image contains a meter at suitable resolution, distance, etc., the class/style/model of the meter within the image, and whether the meter matches the meter obtained in past images taken by the user. The information obtained from the pre-OCR/STDR step can be used as input, along with actual image/video data, in conducting the OCR/STDR steps.

The disclosure describes techniques for providing text detection and text recognition of a metering device, such as an electricity, gas, water, or other meter. In a first example, an imaging device receives a first image depicting information displayed by the meter. The imaging device or other computing device assesses qualities of the first image. Responsive to the assessment, the imaging device may adjust one or more settings to result in an adjusted setting or state of operation. In the example, the adjusting may be based at least in part on the assessed quality of the first image and a characteristic of an optical character recognition (OCR) algorithm. That is, the image-capture feature-settings (e.g., focus, lighting sensitivity, etc.) may be "tuned" to the needs of the OCR algorithm and/or program. A second image is captured using the imaging device set according to the adjusted setting. The OCR algorithm is applied or used on the second image to obtain an alphanumeric value present within the second image. The alphanumeric values or information may then be obtained from the OCR algorithm, and may include consumption information of a utility (gas, electric, water) customer.

General Concepts and Models

Within this document, we discuss models or algorithms for:

User guidance and meter validation (pre-OCR/STDR);
Fraud detection (image alteration);
Optical character recognition (OCR) and/or scene text detection and recognition (STDR); and
Post-OCR/STDR, which might focus on validation of values, authentication, forecasting, and anomaly detection.

Depending on the purpose and model, an example target to learn could be real-valued (e.g., percent of image containing glare), binary (e.g., glare yes/no), or categorical (e.g., high, medium, or low glare). Example models may be on the cellphone, in the cloud, or in some combination. The models may be primary models that use observed data, or may be secondary models that use outputs from primary models. In some cases, a simple algorithm rather than a trained model might be sufficient. For example, a simple algorithm might assess an image as being too dim.

In some examples, an element of a model includes access to a labeled training set of suitable size and quality. This can be a problematic, or even limiting part of model building. Each modeling task may require a different kind of labeling (for percent glare, camera angle, utility consumption meter outline, digit outline, outline of string of digits, etc.).

In some examples, models might conduct two or more tasks. An example is prediction of both serial number and meter value in one model. This could be useful if, for example, serial number characteristics vary with meter value characteristics. For example, the digits of both may occur at the same (unknown) camera angle, or in the same (unknown) font.

Example models to guide users include the following models, one or more of which may be incorporated.

1. General image quality, including glare, focus/blur, angle, lighting, color, and resolution.
2. A model to show a mask on screen that contains boxes for each digit.
3. A model to determine if a meter occurs in the image.
4. A model to determine if the meter face fills the image, or a mask showing the expected outline of the meter face.
5. A model to assess if the meter value or serial number is partially cut off or occluded.
6. A model to assess if a thumb is blocking the camera, or if moisture (like raindrops) are causing poor image quality.
7. A model to determine if there is a reflection in the image, such as from a glass meter cover.
8. A model to determine the class/style of the meter.
9. A model to determine if this is the same meter previously captured.
10. A model to identify bounding boxes around a series of digits.
11. A model to assess confidence in conditions, camera, and image.
12. A model to determine if any digits appear in the image.
13. A model to determine if one or a particular string of digits appears in the image.
14. A model to guide users based on statistics of image quality (perhaps related to blur, lighting, angle, resolution, etc.), where image quality is in reference to those conditions that maximize OCR accuracy (as opposed to more typical human visual quality). That is, reference-free image quality specific to the task at hand.

Models for fraud detection include at least three areas of an image that a user with fraudulent intentions might alter. Examples include: meter reading (e.g., the actual utility consumption quantity); timestamp; and meter serial number. Information used to detect fraud can include that of a single image, a series of images from the same user, and a set of images from the same make and model of camera. Regarding timestamps, for example, the color, size, format, language, and position of the timestamps should match the format supported by the camera. Moreover, the image quality should match that of the camera (e.g., the correct resolution).

Other common methods to detect fraudulent images include looking for reflections and shadows that defy physical laws and checking how many times an image has been compressed and/or saved.

It is also possible to build classification models that run in the cloud to detect whether an image is fraudulent. One possibility is to create a set of altered images using state of the art photo editing software, and then use these along with unaltered images as the training set for a model. Another is to use only unaltered images in a model of image probability. Those submitted images that are unusual would be flagged for further analysis.

One can also build fraud detection models that run on the phone, which verify an image the moment it is taken. One check, for example, is to ensure the camera's location data and timestamp match information from nearby Wi-Fi networks. One can also build a model to determine if the snapshot is of an image or an original object.

Models for OCR/STDR may include a number of example variations, including two individualized models for serial number and meter value, or one model that captures both. Two models for bounding boxes (e.g., identifying a subarea of interest within an image) and digit recognition, or one model that captures both. Models for the set of individual digits in a series of digits, or a model for the whole string of digits.

Given a subset of digits that is known to appear, a model may determine the rest of the digits. For example, given that the last four digits of a serial number are known, a model may identify the other digits. Similarly, given that the past images contain a certain serial number and meter value, a model may use this information as input in assessing the current image.

A model may be created to determine if user-supplied values appear in the image. This is a simpler model than detecting and recognizing arbitrary digits.

A model may be created to converse with or otherwise ask the user about a part of the image. For example, "Is the 4th digit in the serial number a 3 or 8? Or, "Is this the same meter you captured last time?"

In general, example models may use all appropriate information in the construction of the model. Examples include using a dropdown box to select meter style (which has all digits in a fixed location), and using a history of previous reads or user-supplied values in determining current reads. As an example, a utility company may not only know historical meter-readings, but also know the meter serial number, or the meter make, model, year, and/or the appearance of the meter's front or face. This data can also be used to verify user input values.

Models for post processing may be created to, over time, provide better validation and/or forecast results. For example, a model could be constructed to estimate the likelihood (or anomaly) of a meter reading, given a history of meter readings. Such a model could even include socio-economic data, like neighborhood information, local house values, house size, family income, the energy usage of neighbors, weather, season, the presence of solar panels, the history of large or fast loads, etc.

Example Systems and Techniques

FIG. 1 shows an example utility network 100 having a meter text-detection and text-recognition system. Text may include any visual information, such as alphanumeric characters, barcodes, numerals on wheels (dial readings), numerals on a screen of a meter, QR codes, etc. And even more broadly, meter type recognition is frequently performed in parallel with, or prior to, text-detection functionality. In an example, text-detection includes finding text, barcodes, QR codes, a meter brand, model, and/or type, etc. in an image. Text-recognition includes actually reading those portions of the image and deriving the embedded information. In some STDR algorithms, text-detection and text-recognition are unified into a single over-arching algorithm, while in other STDR algorithms the two functions may operate somewhat separately within the STDR program. In some instances, the two functions may benefit if different images are provided to each function. For example, an image that is more tightly zoomed-in on a meter's output screen may benefit the text-recognition algorithm, while an image that is zoomed-out allows recognition of the meter itself and the location of the meter's output screen.

Thus, text-detection refers to identifying whether or not any text object occurs in a scene (e.g., text verification), and if text appears, identification of those sub-regions that contain text (i.e., text localization). Accordingly, text-detection finds sub-image areas having text. Text-recognition refers to translation of image sub-regions into characters, words, or text lines, as they appear in a natural or symbolic language. Accordingly, text-recognition finds text characters (e.g., ASCII characters) within the sub-images.

While this document refers to "images," both still pictures and moving video (as their associated text files) are considered to be images for purposes of discussion and the claims.

The example network 100 shows two possible configurations. In one configuration, the software 102 configured for text detection and recognition of a metering device is located in smartphone 104. In a second configuration, the software 106 configured for text detection and recognition of a metering device is located in servers 108 of a cloud or central office.

In the example, the network 100 may include one or more of private network(s) or the internet 110, and may be in communication with a router device 112, which is part of a mesh or star network of radio-connected customer utility consumption meters 114-126. Additional network devices 128 may be present, and the network devices shown are meant to be representative of a network that may be much larger. Each meter may communicate with upstream and/or downstream meter(s) and/or the router device 112. Information, including software updates, commands, responses, customer consumption information, etc., may be passed up and down the network in a two-way manner.

In some examples, the meter text detection and recognition applications 102, 106 may be separate software applications. In other examples, the applications 102, 106 may communicate and share information and/or processing chores. Accordingly, some of the functionality of the system may be built into each of the applications 102, 106. For example, OCR functionality may be built into application 106. However, image-setting-determination (e.g., flash and focus) and/or aspects of feature recognition (e.g., recognition of the "screen" or output device of the meter) may be built into the application 102 running on the smartphone 104. Other and/or different functional divisions may be used, depending on the design parameters of the system.

Figure 2:
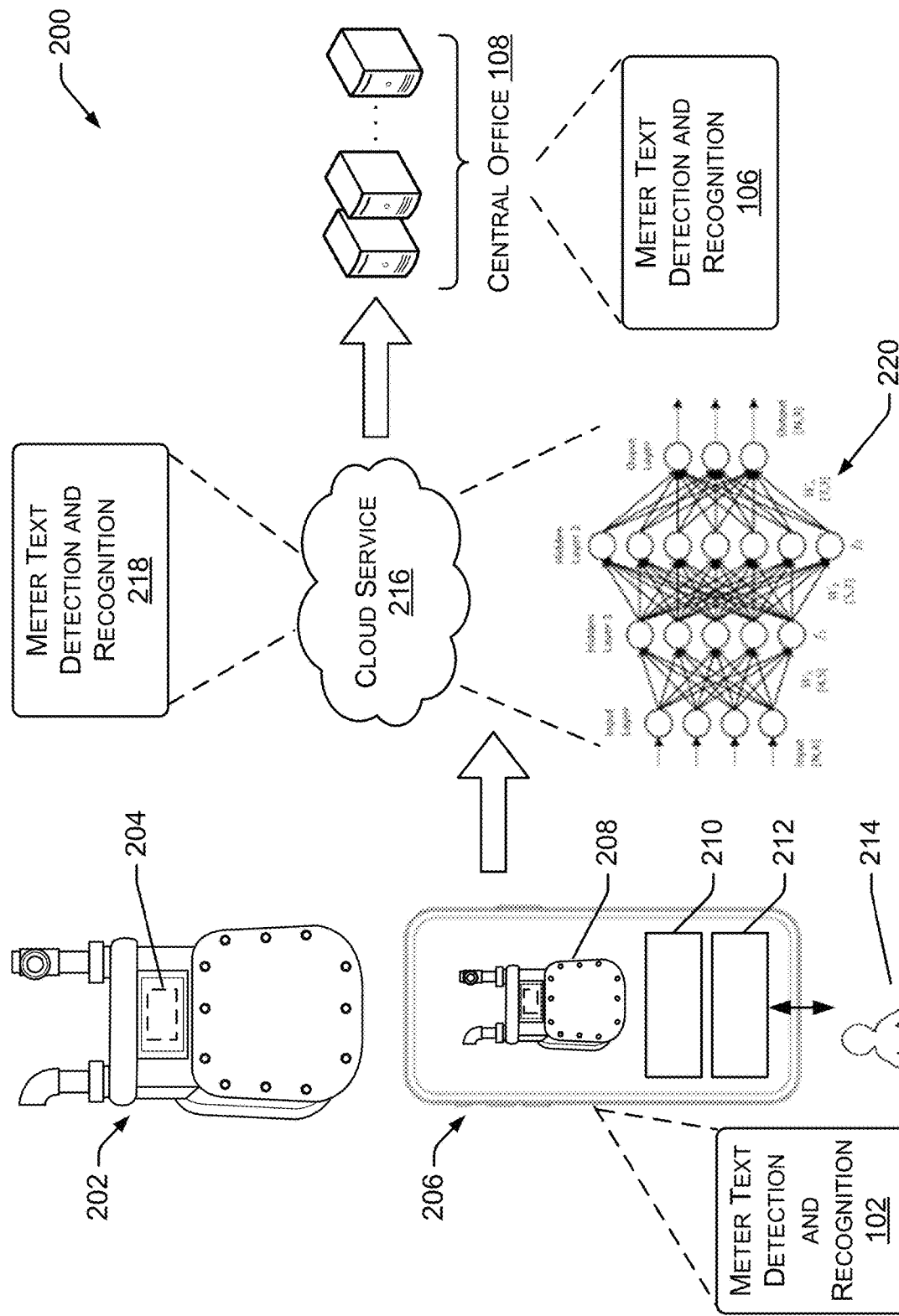
FIG. 2 is a block diagram, showing an example process wherein one or more of cloud service, a user device, and/or a utility company server is configured for meter text detection and recognition.

FIG. 2 shows an example process 200 wherein the functionality of meter text detection and text recognition software may by distributed among one or more locations and devices. Meter text detection and text recognition software 102 may be contained within user device 206. Meter text detection and text recognition software 218 may be contained within a cloud service 216. Meter text detection and text recognition software 106 may be contained within a central office server 108.

In the example process 200, a utility meter 202 (e.g., gas, electricity, or water meter) includes a screen or other output device 204. The output device may include a screen with alphanumeric output, such as numerals indicating a customer's current consumption quantity. In some meters, the output device includes rotating "wheels," dials, disks or other mechanical devices having numbers or pointers indicating a current consumption quantity. In other examples, the screen or output device 204 may include alphanumeric text, a barcode, QR code, or other information display format.

A user device 206 may be configured as a cellular telephone, tablet, or other computing device. In the example shown, a user 214 has taken a picture 208 (i.e., captured an image) using a smartphone 206. The user may communicate with meter text detection and recognition software 102 with a user interface on the device 206, which may present messages, prompts, or other information 210 to the user 214. Additionally, the user may provide information to the meter text detection and recognition software 102 by entering it as text in a window 212 or as voice commands, responses, etc. In an example, the software may instruct (e.g., using text window 210) the user 214 to read and enter the information from the meter (e.g., a "meter reading" of the current consumption value of level of the utility customer) using input window 212 or voice input.

In another example, the meter text detection and recognition software 218 may be located, at least in part, in a cloud service 216. In an example, the cloud service may utilize a neural network 220 to perform some or all of the functionality of the techniques used for meter text detection and text recognition.

In the example shown, the image 208 of the meter, along with text entered into user interface 212 by the user 214 of device 206, passes through the cloud service 216 and to a central office 108. In some examples, some or all of the meter text detection and recognition software 106 is located on the central office server 108. Accordingly, all or part of the meter text detection and recognition software 106 may be located on one or more of the user device 206, the cloud 216, and the central office server 108.

Figure 3:
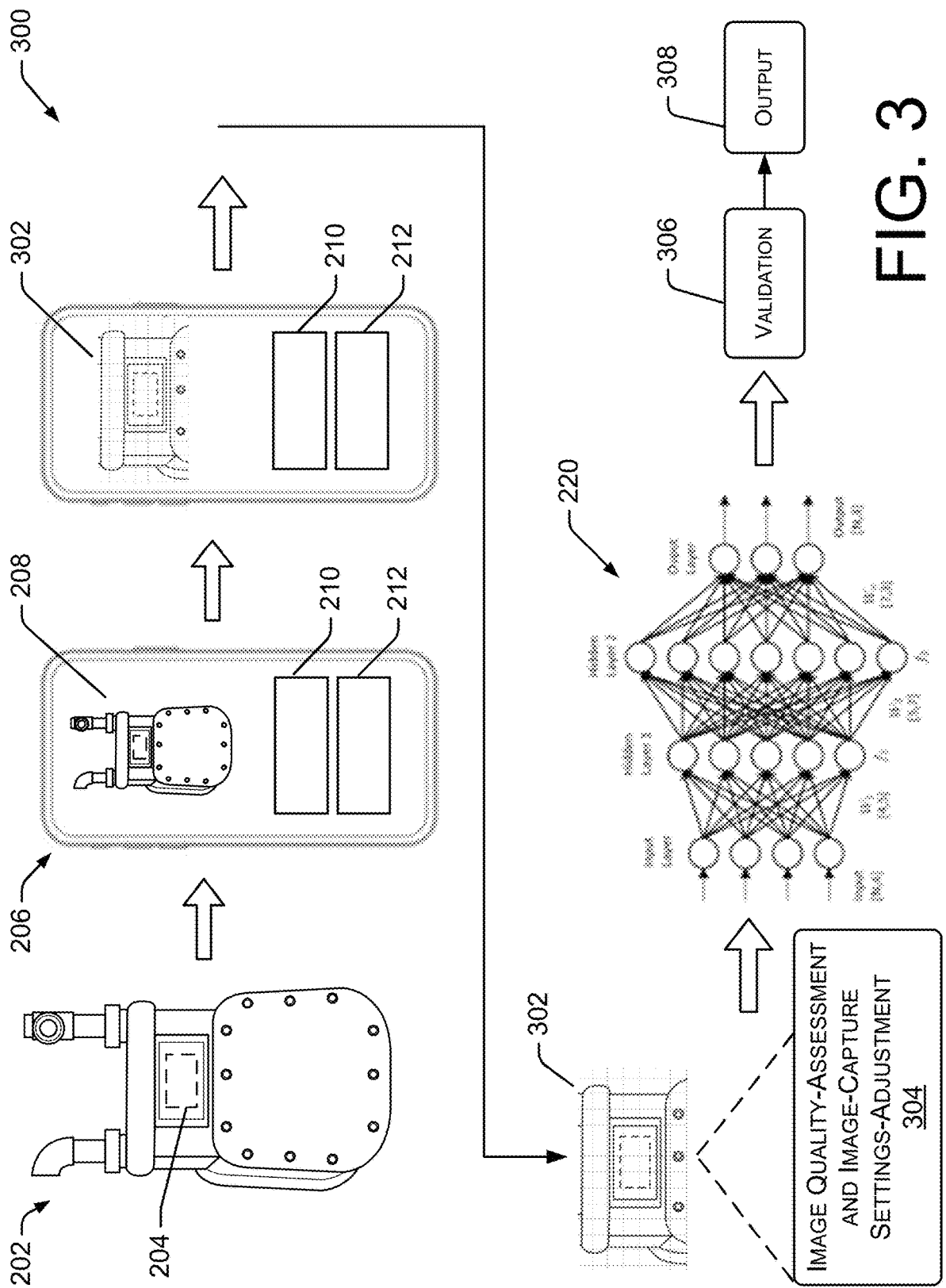
FIG. 3 is a block diagram, showing a process by which meter text detection and recognition is performed.

FIG. 3 shows a further example process 300 by which meter text detection and recognition is performed. In the example, a customer consumption-metering device 202 (e.g., for gas, or alternatively for electricity or water) is configured with an output device 204, such as a screen, to display text, alphanumeric characters, barcodes, QR codes, etc., which may generally be referred to as "text" or alphanumeric information.

In the example, the user device captures an image 208 of the meter 202. Using "zoom," focus and/or other settings, the image becomes a more detailed image 302, which better displays the screen 204 for text-detection and/or text-recognition.

The image 302 may be assessed for meter text detection and text recognition by the model 220, e.g., mathematical approach or algorithm, neural net, etc. At block 304, image quality-assessment and image-capture settings-adjustment 304 may be performed, such as by the neural network 220 or other model, software, and/or application. In a first example, characteristics of the image may be assessed. One characteristic of the image is to determine what make, model or type of meter is shown. Additional characteristics include glare, focus, blur, angle, lighting, color and/or resolution. Additional information to be obtained and/or assessed include the settings of the image-capture device at the time of image-capture. Examples include the degree of zoom, the adjustment of focus, the flash setting, movement of the device as the image was taken, etc.

In some cases, the image will be adequate as captured, to perform meter text-detection and text-recognition. In other cases, the image quality-assessment will indicate that an improved image will be required, and that appropriate adjustment of the image-capture settings (e.g., focus, zoom, flash, etc.) is indicated. In some examples, the image and information about the image-capture settings are sent to the neural network 220 and/or meter text detection and recognition systems (e.g., a system 102 on the user device 206, a system 218 on the cloud service 216, and/or a system 106 on a utility company's server 108). In some examples, the settings of the image-capture device—at the time of image-capture—are sent to the algorithm(s) and may assist the algorithm(s) to interpret the image.

At block 306, the meter text-detection and text-recognition may be validated. The validation may be based on a satisfactorily low likelihood of fraudulent action(s) by the customer. In some instances, where the user enters (e.g., into user interface 212 of device 206) what the user sees on screen 204, validation 306 may indicate a match between text derived from the meter image 302 and text representing the user's input. In some cases, the match is indicated by a probability over a threshold that user input is the same as OCR output.

At block 308, a result of the meter text-detection and text-recognition may be output. The output may include consumption information, as indicated by the screen 204 of the meter 202. It may also include other information, such as the make, model and/or type of meter in the image (e.g., image 208 or 302). It may include information about the settings (focus, flash, etc.) of the imaging device. In an example, such settings may be used as a starting point for the next meter-reading at the next customer-billing cycle.

Example Methods

In some examples of the techniques discussed herein, the methods of operation may be performed by one or more application specific integrated circuits (ASIC) or may be performed by a general-purpose processor utilizing software defined in computer readable media. In the examples and techniques discussed herein, the memory (e.g., in a cellphone, cloud computing device, or other computer) may comprise computer-readable media and may take the form of volatile memory, such as random-access memory (RAM) and/or non-volatile memory, such as read only memory (ROM) or flash RAM. Computer-readable media devices include volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device.

As defined herein, computer-readable media does not include transitory media, such as modulated data signals and carrier waves, and/or signals.

Figure 4:
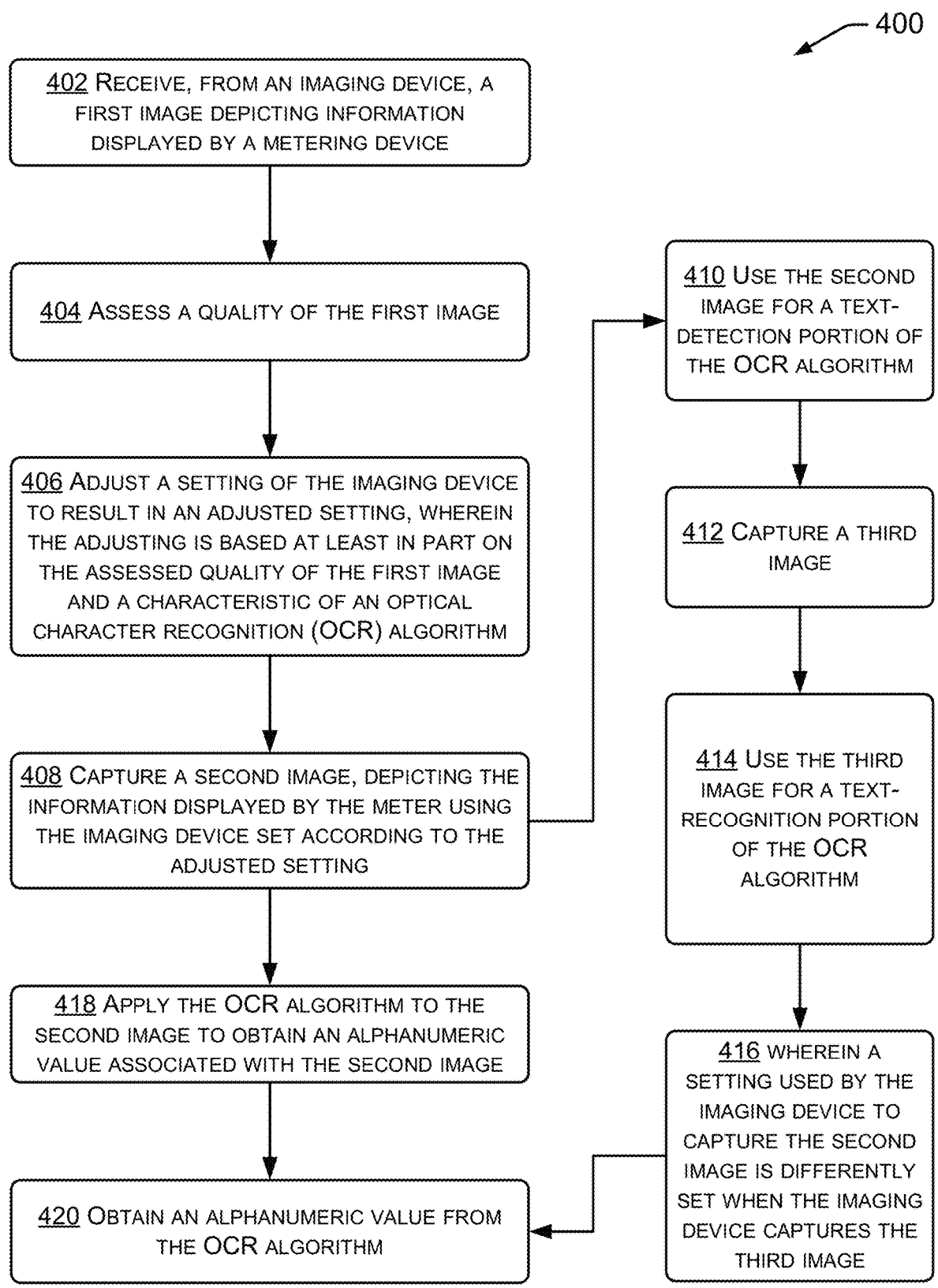
FIG. 4 is a flowchart showing an example method performing some aspects of meter text detection and recognition.

FIG. 4 shows an example method 400 that performs aspects of meter text-detection and text-recognition. In the example method, the quality of a first image is assessed. The assessment may be made from the point of view of an OCR algorithm, in that the image quality is based on the needs of the algorithm. The assessment may be used to adjust image-capture settings (e.g., flash, focus, zoom, etc.) used to capture a second image, which is better suited to meter text-detection and text-recognition. In the optional embodiment shown by blocks 410-416, a third image is also captured. In this optional embodiment, the second image may be used for meter type determination and text-detection. The third image may be used for text-recognition. In an example, the second image may include the entire meter, and may be used to recognize the meter make/model/type and to find where the text is located within the image, i.e., text-detection. Having found the text, the third image may zoom in on, and focus particularly on, the text. Accordingly, the third image is used for text recognition.

At block 402, a first image depicting information displayed by a metering device is received from an imaging device. Referring to the example of FIG. 2, the imaging device may be a camera within a cellphone 206 or other customer equipment. At block 404, a quality of the first image is assessed. The assessment may include aspects of meter type, glare, focus, blur, angle, lighting, color, resolution, etc. At block 406, at least one setting of the imaging device is adjusted to result in an adjusted state or setting, wherein the adjusting is based at least in part on the assessed quality of the first image and a characteristic of an optical character recognition (OCR) algorithm. In an example, the setting(s) of the image capture device are adjusted to more nearly fill the needs and/or expectations of the OCR algorithm. At block 408, a second image is captured, depicting the information displayed by the meter using the imaging device set according to the adjusted setting(s).

Blocks 410-416 describe an optional example representing how an OCR algorithm may benefit from two or more images, each taken using at least somewhat different image-captures settings. In an example, one image (taken with a first combination of settings) may result in better text-detection, while another image (taken with a second combination of settings) may result in better text-recognition. In an example of images taken from video, different portions of an OCR algorithm may achieve better results using different frames (e.g., anchor frames) within a video file. At block 410, the second image is used for, and/or provided to, a text-detection portion of the OCR algorithm. At block 412, a third image is captured. At block 414, the third image may be used for a text-recognition portion of the OCR algorithm. At block 416, one or more settings used by the imaging device to capture the second image may be differently set when the imaging device captures the third image. That is, the focus, zoom, and/or the flash, etc., may be differently set when capturing the second and third images. At block 418, the OCR algorithm is applied to the second image to obtain an alphanumeric value associated with the second image. At block 420, an alphanumeric value is obtained from the OCR algorithm.

Figure 5:
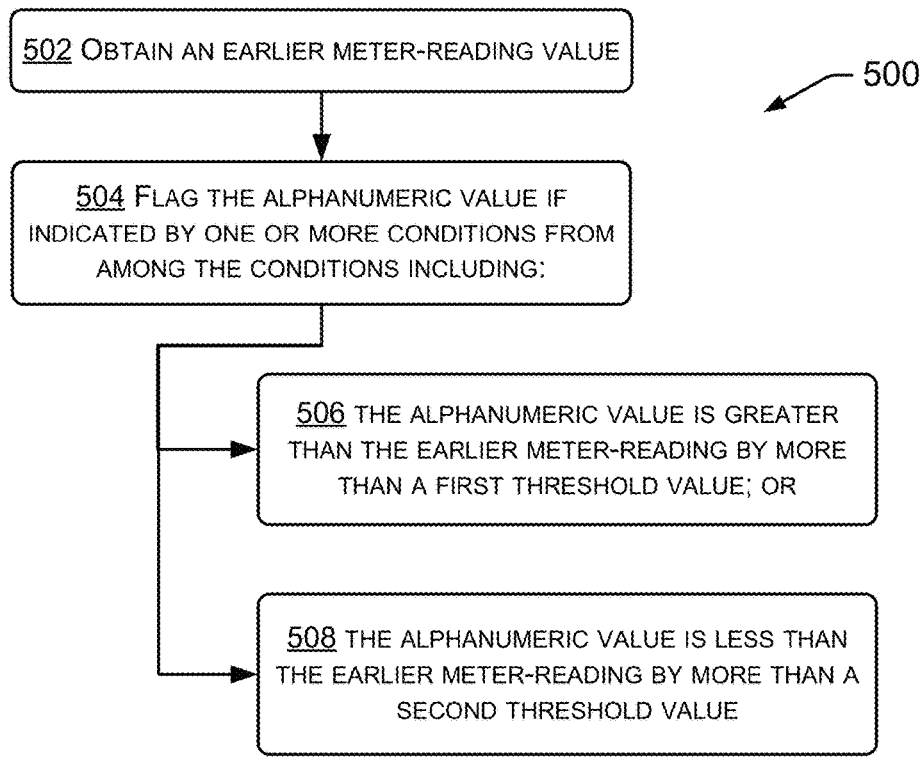
FIG. 5 is a flowchart showing an example method performing aspects of fraud detection.

FIG. 5 shows an example method 500 performing aspects of fraud detection. In example fraud detection, the value (e.g., of a meter-reading) obtained by OCR and/or user input could be flagged for fraud if the reading was significantly higher or lower than previous readings. In an example, the method 500 may utilize a possibility of modeling the history of readings to get an expected prediction distribution. In some installations, such techniques may be more useful than simply assessing if a read value is larger or smaller than a historic value by more or less than a threshold value. In particular, a Bayesian method could be used to provide the full predictive distribution. This distribution could be used in risk assessment (which considers the likelihood of a reading and the impact of that reading). For example, an unusually high reading might have less risk than an unusually low one (which may be motivated by fraud). In the event that the model output is a probability value (that a specific (e.g., user-input) value appears in the image), fraud/error can be checked with just the user input. That is, fraud/error detection can make use of user input, model output, or both. In some examples, the model output could be characters recognized by the OCR algorithm or could be probabilities. In another example, error/fraud assessment could be performed on a customer's device. Alternatively, or additionally, information could be sent to a headend computing device for error and/or fraud detection. In other examples, neighborhood data and/or other data about the customer, location, weather, etc. could be used in detection of fraud/error. For example, if a model input included average utility consumption values for customers in a small region, the daily weather, and/or day of week, this information could be used to detect a reading that is unusually high/low, thereby indicating possible fraud and/or error.

At block 502, an earlier meter-reading value is obtained. In an example, the earlier meter-reading could be the customer's previous month's meter-reading. At block 504, an alphanumeric value (e.g., as obtained by operation of the method of FIG. 4) is flagged if indicated by one or more conditions. Example conditions include block 506, in which the alphanumeric value is greater than the earlier meter-reading by more than a first threshold value, and include block 508, in which the alphanumeric value is less than the earlier meter-reading by more than a second threshold value.

Figure 6:
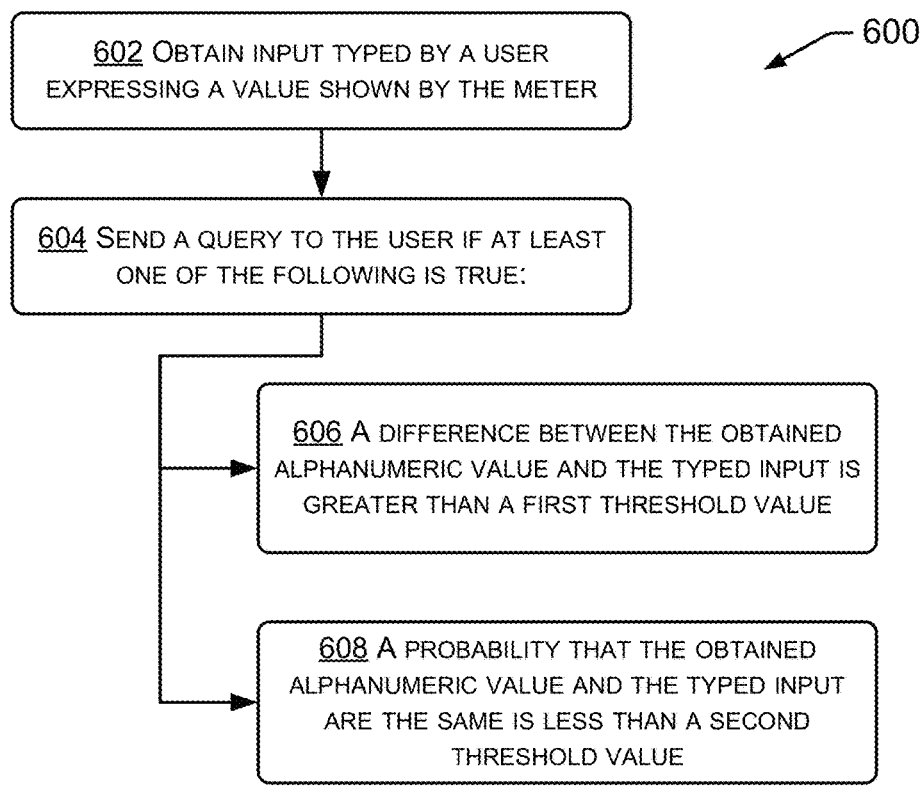
FIG. 6 is a flowchart showing an example method for receiving user input and querying the user if camera-captured data and the user's input (e.g., typed, spoken, multi-faceted user interface etc.) indicates a possible discrepancy.

FIG. 6 shows an example method 600 for receiving user input and querying the user if camera-captured data and the user's input indicates a possible discrepancy. The query may ask the user to check the user's input or to call the utility company for assistance. In an example, given user input, a system may determine if a specific string of text or a specific bar code appears in a given image. This may be a (potentially graded) yes/no answer, rather than an alphanumeric answer. In an example, the difference between user input and camera-captured data may imply a comparison of two values—for example, a user input of 234 and an algorithm output of 235—having a difference of 1. In an alternative embodiment, a probability may be derived that the image contains the value "234."

At block 602, user input (e.g., as typed, spoken or otherwise entered) by a user is obtained by the meter text-detection and text-recognition algorithm (e.g., applications 102, 218, 106 of FIG. 2). The user input may express a value shown by the meter, which may indicate the customer's consumption of the utility service. At block 604, a query is sent to the user if indicated by one or more conditions. In the example of block 606, if a difference between the obtained alphanumeric value and the typed input is greater than a first threshold value then a query may be sent to the user. In the example of block 608, if a probability that the obtained alphanumeric value and the typed input are the same is less than a second threshold value a query may be sent to the user.

FIG. 7 shows an example method 700 for recognizing a meter "make" (i.e., manufacturer) and/or model in a captured image, and "zooming" in on relevant portions of the image. At block 702, a type of the meter is recognized in the first image. The meter may be recognized in part by shape, markings, etc. In some examples, previous meter-reads may suggest a meter type, which is then confirmed or denied by examination of the first image. At block 704, image-capture settings (e.g., zoom) are used to reposition metering data shown by the meter within a field of view of the imaging device for capture of the second image. In an example, because different meters have display screens in different locations, the zooming may be based at least in part on the type of the meter recognized.

FIG. 8 shows an example method 800 for recognizing relevant portions of an image of a meter and applying an OCR algorithm to those portions. In the example method, the type of meter is recognized. Since the location of the screen on known meters is also known, the area of the image requiring text-recognition (e.g., a sub-image) is reduced. At block 802, a type of the meter is recognized, in at least one of the first image and the second image. At block 804, a portion of the second image associated with a screen of the recognized type of meter is determined. At block 806, the OCR algorithm is applied to the portion of the second image while refraining from applying the OCR algorithm to another portion of the second image.

FIG. 9 shows an example method 900 for recognizing a make, model, and/or type of a meter, a serial number of a meter, etc. and determining possible fraud, perhaps based on earlier-performed meter-reading(s). In an example, if the user sends a photo of the wrong kind of meter, an alert of possible fraud is indicated. At block 902, a type of the meter or a serial number of the meter is recognized in at least one of the first image or the second image. At block 904, the type of the meter or the serial number of the meter may be determined to be different from a type of meter shown in an image from an earlier meter-reading. This would tend to indicate error, fraud, and/or mistake. At block 906, a notice of possible fraud or error may be sent to an appropriate server of the utility company.

FIG. 10 shows an example method 1000 for obtaining user input and providing the input to an OCR algorithm (e.g., program or application). In an example, the user takes a picture of the user's (customer's) meter, and also types or speaks the information indicated by the output panel of the meter. This information is the current meter reading, which may be 4, 6 or a different number of numerals or other characters. Both the user-input data and the user-captured image may be sent to a server of the utility company (or third-party agent). At block 1002, user input (e.g., as typed, spoken or otherwise entered) by a user is obtained by the meter text-detection and text-recognition algorithm (e.g., applications 102, 218, 106 of FIG. 2). The input may express a value shown by the meter, i.e., the current meter-reading. At block 1004, the typed or spoken input is provided to the OCR algorithm. The OCR algorithm may operate at least in part to confirm existence of data within the second image that is consistent with the typed or spoken input.

FIG. 11 shows modifications 1100 that may be applied to other methods depending on a utility company's design requirement specification. In the example of block 1102, the adjustment of settings on the imaging device includes adjusting settings of a camera of a mobile device. The adjusting of the image-capture settings may include adjustments of the focus, flash, zoom, etc., for use with an OCR algorithm. In the example of block 1104, the OCR algorithm may additionally include at least one of: at block 1106, executable instructions located in a memory of the mobile device; or at block 1108, executable instructions located on a computing device in communication with the mobile device.

Figure 12:
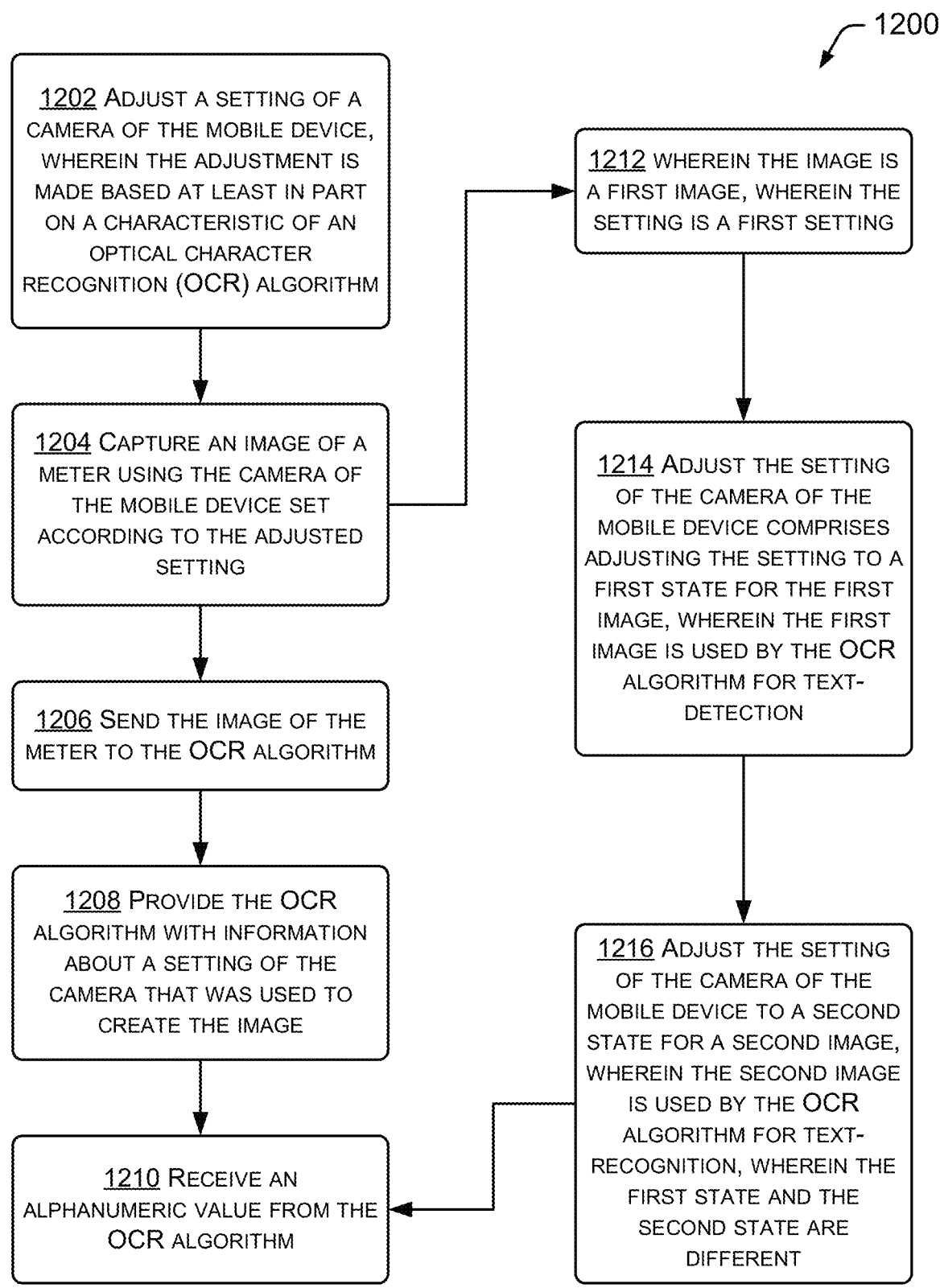
FIG. 12 is a flowchart showing an example method for setting image-capture settings, capturing images, and providing appropriate images to an OCR algorithm.

FIG. 12 shows an example method 1200 for setting image-capture settings, capturing images, and providing appropriate images to an OCR algorithm. At block 1202, a setting of a camera of the mobile device is adjusted. In an example, the adjustment is made based at least in part on a characteristic of an STDR algorithm. In a further example, if the OCR algorithm is able to tolerate only a threshold level of reflected glare off the plastic cover of an output screen of a meter (the example OCR characteristic) then the adjustment to the setting of the camera may set a flash level to result in a tolerable level of glare. At block 1204, an image of a meter is captured using the camera of the mobile device set according to the adjusted setting. At block 1206, the image of the meter is sent to the OCR algorithm. At block 1208, the OCR algorithm is provided with information about setting(s) of the camera that was/were used to create the image. The OCR algorithm may be able to operate more accurately if it is informed of settings of the image-capture device. The OCR algorithm may additionally be able to suggest more helpful settings to be used by the image-capture device, to result in more accurate optical character recognition. At block 1210, an alphanumeric value is received from the OCR algorithm. In some examples, the alphanumeric value is related to, or defines, the customer's consumption level of a utility consumable for billing period.

Blocks 1212-1216 show a further example, where a second image is taken. In the example, the first image is used for text-detection (finding sub-images within the image having text) and the second image is used for text-recognition (determining the identity of the characters within a sub-image having text). At block 1212, the image taken at block 1204 is a first image (of a two-image process, one image for text-detection and one image for text-recognition). At block 1214, the setting(s) of the camera of the mobile device were previously set to a first state for the first image, and are then adjusted at block 1216 to a second state for a second image. In the two-image example, the second image is used by the OCR algorithm for text-recognition.

Figure 13:
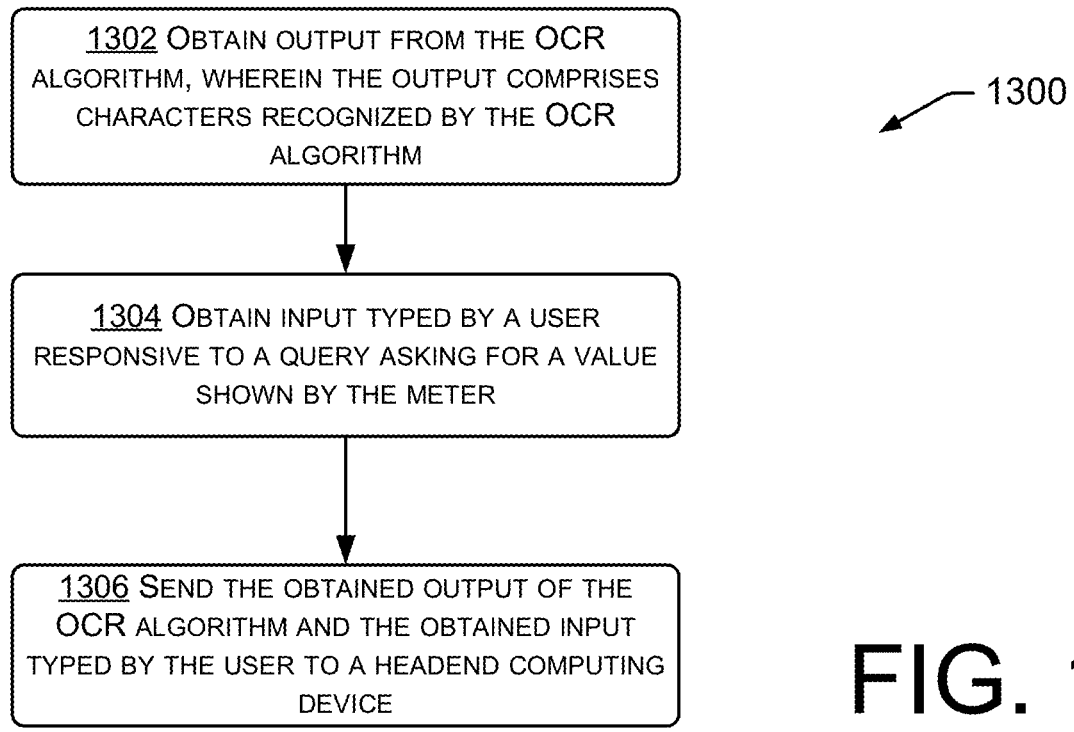
FIG. 13 is a flowchart showing an example method for obtaining user input and images, and for providing them to an OCR algorithm.

FIG. 13 is a flowchart showing an example method 1300 for obtaining user input and images, and for providing them to an OCR algorithm. At block 1302, OCR algorithm output is obtained. In an example, the output comprises characters recognized by the OCR algorithm. At block 1304, user input is obtained. In an example, the input may be typed or spoken by a user, and may be responsive to a query asking for a value shown by the meter. At block 1306, the user input and the OCR algorithm output are sent to a headend computing device, a third-party cloud device, or other computing device.

Figure 14:
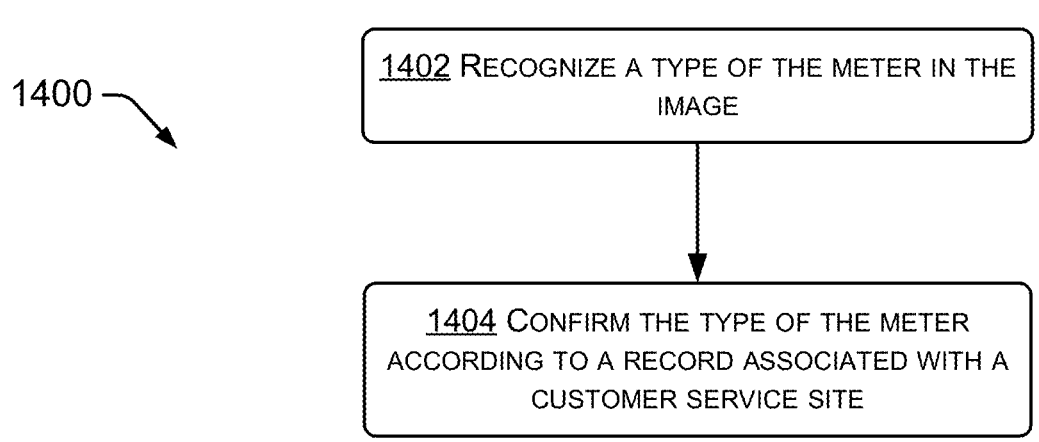
FIG. 14 is a flowchart showing an example method for recognizing a type of meter, confirming the type, and preventing fraud.

FIG. 14 shows an example method 1400 for recognizing a type of meter, confirming the type, and preventing fraud. At block 1402, a type of the meter in the image is recognized. At block 1404, the type of the meter is confirmed according to a record associated with a customer service site. That is, if the image and utility company records indicate a particular type, make, and/or model of meter then this tends to reduce the likelihood of fraud.

Figure 15:
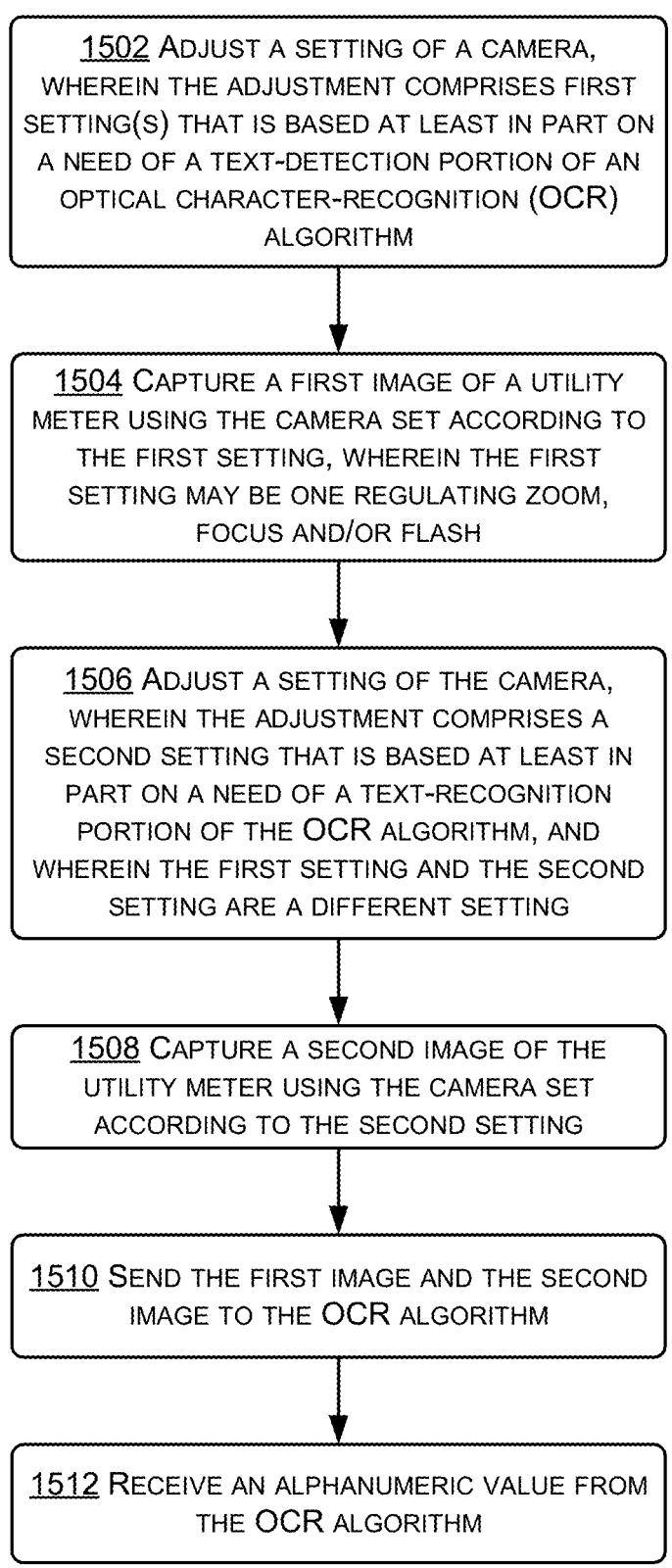
FIG. 15 is a flowchart showing an example method performing aspects of adjustment of image-settings, capture of images, and operating an OCR algorithm.

FIG. 15 shows an example method 1500 for performing aspects of adjustment of image-settings, capture of images, and operating an OCR algorithm. At block 1502, a setting of a camera is adjusted. In an example, the adjustment comprises first setting(s) that is based at least in part on a need of a text-detection portion of an OCR algorithm. At block 1504, a first image of a utility meter is captured using the camera set according to the first setting. In an example, the first setting may be one regulating zoom, focus and/or flash. At block 1506, a setting of the camera is adjusted. In an example, the adjustment comprises a second setting that is based at least in part on a need of a text-recognition portion of the OCR algorithm. In a further example, the first setting and the second setting are a different setting. At block 1508, a second image of the utility meter is captured using the camera set according to the second setting. At block 1510, the first image and the second image are sent to the OCR algorithm. At block 1512, an alphanumeric value is received from the OCR algorithm.

Figure 16:
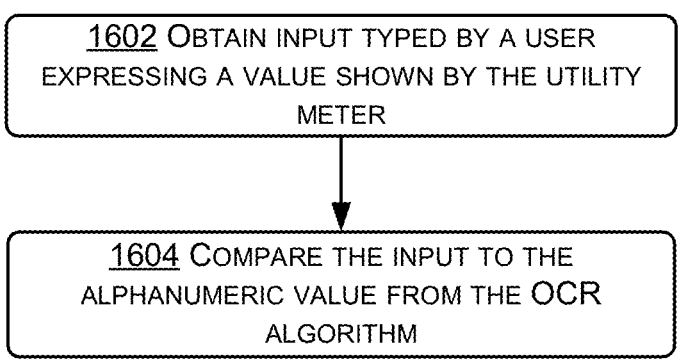
FIG. 16 is a flowchart showing an example method including aspects of comparing user input to the output of an OCR algorithm.

FIG. 16 shows an example method 1600 including aspects of comparing user input to the output of an OCR algorithm. At block 1602, input typed or spoken by a user is obtained. In an example, the input expresses a value shown by the utility meter. At block 1604, the input is compared to the alphanumeric value from the OCR algorithm. If the two values are the same, the veracity of the value is increased. If the two values differ, fraud or error may be investigated. In an example, the user may be prompted to enter the meter-reading a second time (e.g., to user interface 212 of FIG. 2) and to take a second image of the meter (e.g., photograph or video 208 of FIG. 2).

Figure 17:
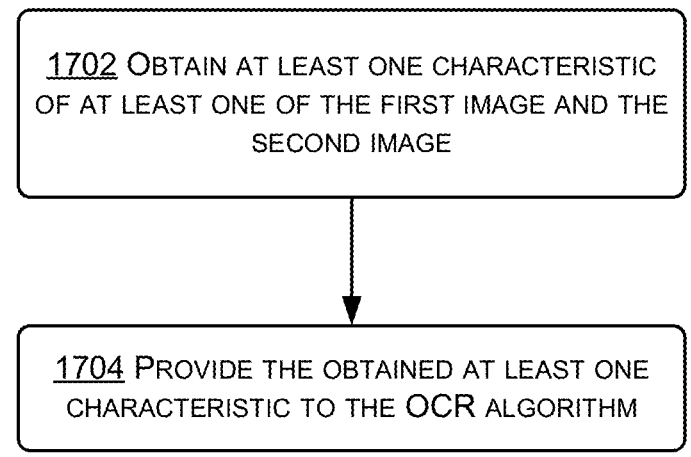
FIG. 17 is a flowchart showing an example method for providing characteristics (e.g., lighting or focus) to an OCR algorithm.

FIG. 17 shows an example method 1700 for providing characteristics (e.g., lighting or focus) to an OCR algorithm. At block 1702, at least one characteristic of at least one of the first image and the second image is obtained. In an example, the characteristic may be related to meter type, glare, focus, blur, angle, lighting, color, resolution, etc. At block 1704, the obtained at least one characteristic is provided to the OCR algorithm. In an example, if the OCR algorithm finds lighting levels to be out-of-spec, then it may request a further image taken with flash.

Figure 18:
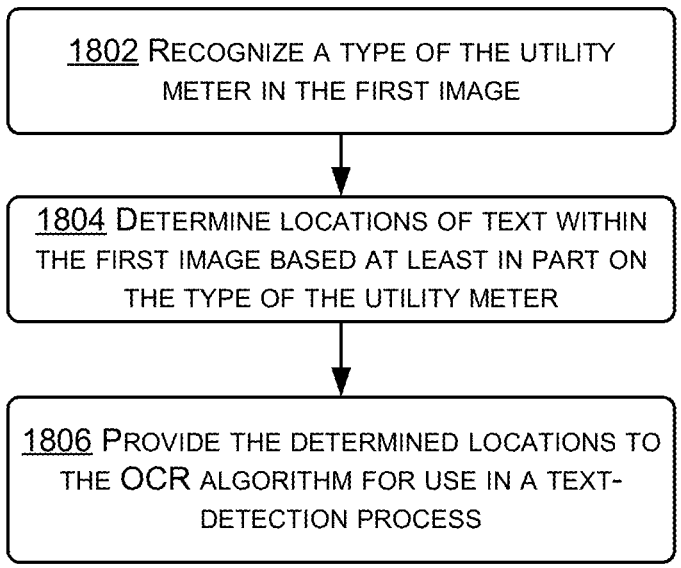
FIG. 18 is a flowchart showing an example method for recognizing a type of a meter, determining relevant locations of text in the image, and providing those locations to an OCR algorithm.

FIG. 18 shows an example method 1800 for recognizing a type of a meter, determining relevant locations to search for text within the first image, and providing those locations to an OCR algorithm. At block 1802, a type of the utility meter is recognized in the first image. The type may be brand, model, year, etc. At block 1804, locations of text within the first image based at least in part on the type of the utility meter are determined. In an example, the "screen" on a certain type of meter may be a known number of inches left or right, or above or below, certain features of the meter (e.g., a top of the meter, an in-coming pipe, etc.). Accordingly, when the meter is recognized locations of the image having high likelihood of containing text will be known. Accordingly, the difficult task of text-recognition may be more easily solved, by first identifying the type of meter. At block 1806, the determined locations to look for text may be provided to the OCR algorithm for use in a text-detection process.

Example Techniques

The following examples of meter text detection and recognition are expressed as number clauses. While the examples illustrate a number of possible configurations and techniques, they are not meant to be an exhaustive listing of the systems, methods, smart device applications, and/or software described herein.

1. A method of detecting and recognizing text associated with a meter, comprising: receiving, from an imaging device, a first image depicting information displayed by the meter; assessing a quality of the first image; adjusting a setting of the imaging device to result in an adjusted setting, wherein the adjusting is based at least in part on the assessed quality of the first image and a characteristic of an optical character recognition (OCR) algorithm; capturing a second image, depicting the information displayed by the meter, using the imaging device set according to the adjusted setting; applying the OCR algorithm to the second image to obtain an alphanumeric value associated with the second image; and obtaining the alphanumeric value from the OCR algorithm.

2. The method of clause 1, wherein the characteristic of the OCR algorithm comprises at least one of: a degree of illumination of the meter by the imaging device required by the OCR algorithm to successfully recognize characters; or an amount of reflected glare that the OCR algorithm can tolerate while still successfully recognizing characters.

3. The method of clause 1 or any previous clause, additionally comprising: obtaining an earlier meter-reading value; and flagging the alphanumeric value if indicated by one or more conditions from among the conditions comprising: the alphanumeric value is greater than the earlier meter-reading by more than a first threshold value; or the alphanumeric value is less than the earlier meter-reading by more than a second threshold value.

4. The method of clause 1 or any previous clause, additionally comprising: obtaining input typed by a user expressing a value shown by the meter; and sending a query to the user if at least one of the following is true: a difference between the obtained alphanumeric value and the typed input is greater than a first threshold value; or a probability that the obtained alphanumeric value and the typed input are the same is less than a second threshold value.

5. The method of clause 1 or any previous clause, additionally comprising: recognizing a type of the meter in the first image; and zooming in or out to reposition metering data shown by the meter within a field of view of the imaging device for capture of the second image, wherein the zooming is based at least in part on the type of the meter recognized.

6. The method of clause 1 or any previous clause, additionally comprising: recognizing a type of the meter in at least one of the first image and the second image; determining a portion of the second image associated with a screen of the recognized type of meter; and applying the OCR algorithm to the portion of the second image while refraining from applying the OCR algorithm to another portion of the second image.

7. The method of clause 1 or any previous clause, additionally comprising: recognizing a type of the meter or a serial number of the meter in at least one of the first image or the second image; determining that the type of the meter or the serial number of the meter is not the same as a type of meter shown in an image from an earlier meter-reading; and sending a notice of possible fraud or error.

8. The method of clause 1 or any previous clause, additionally comprising: obtaining input typed by a user expressing a value shown by the meter; and providing the typed input to the OCR algorithm, wherein the OCR algorithm operates at least in part to confirm existence of data within the second image that is consistent with the typed input.

9. The method of clause 1 or any previous clause, wherein: adjusting settings on the imaging device comprises adjusting settings of a camera of a mobile device; and the OCR algorithm comprises: executable instructions located in a memory of the mobile device; or executable instructions located on a computing device in communication with the mobile device.

10. The method of clause 1 or any previous clause, wherein adjusting settings on the imaging device comprises: using the second image for a text-detection portion of the OCR algorithm; capturing a third image; and using a third image for a text-recognition portion of the OCR algorithm; wherein a setting used by the imaging device to capture the second image is differently set when the imaging device captures the third image.

11. An application for a mobile device, which performs actions comprising: adjusting a setting of a camera of the mobile device, wherein the adjustment is made based at least in part on a characteristic of an optical character recognition (OCR) algorithm; capturing an image of a meter using the camera of the mobile device set according to the adjusted setting; sending the image of the meter to the OCR algorithm; and receiving an alphanumeric value from the OCR algorithm.

12. The application as recited in clause 11, wherein the image is a first image, wherein the setting is a first setting, and wherein the actions additionally comprise: adjusting the setting of the camera of the mobile device comprises adjusting the setting to a first state for the first image, wherein the first image is used by the OCR algorithm for text-detection; and adjusting the setting of the camera of the mobile device to a second state for a second image, wherein the second image is used by the OCR algorithm for text-recognition; wherein the first state and the second state are different.

13. The application as recited in clause 11 or any previous clause, additionally comprising: obtaining output from the OCR algorithm, wherein the output comprises characters recognized by the OCR algorithm; obtaining input typed by a user responsive to a query asking for a value shown by the meter; and sending the obtained output of the OCR algorithm and the obtained input typed by the user to a headend computing device.

14. The application as recited in clause 11 or any previous clause, wherein the actions additionally comprise: providing the OCR algorithm with information about a setting of the camera that was used to create the image.

15. The application as recited in clause 11 or any previous clause, additionally comprising: recognizing a type of the meter in the image; and confirming the type of the meter according to a record associated with a customer service site.

16. One or more computer-readable media storing computer-executable instructions that, when executed by one or more processors, configure a computing device to perform acts comprising: adjusting a setting of a camera, wherein the adjustment comprises a first setting that is based at least in part on a need of a text-detection portion of an optical character-recognition (OCR) algorithm; capturing a first image of a utility meter using the camera set according to the first setting; adjusting a setting of the camera, wherein the adjustment comprises a second setting that is based at least in part on a need of a text-recognition portion of the OCR algorithm, and wherein the first setting and the second setting are different; capturing a second image of the utility meter using the camera set according to the second setting; sending the first image and the second image to the OCR algorithm; and receiving an alphanumeric value from the OCR algorithm.

17. The one or more computer-readable media as recited in clause 16, wherein the first setting comprises a setting for at least one of zoom, focus or flash.

18. The one or more computer-readable media as recited in clause 16 or any previous clause, additionally comprising: obtaining input typed by a user expressing a value shown by the utility meter; and comparing the input to the alphanumeric value from the OCR algorithm.

19. The one or more computer-readable media as recited in clause 16 or any previous clause, wherein the acts additionally comprise: obtaining at least one characteristic of at least one of the first image and the second image; and providing the obtained at least one characteristic to the OCR algorithm.

20. The one or more computer-readable media as recited in clause 16 or any previous clause, additionally comprising: recognizing a type of the utility meter in the first image; determining locations of text within the first image based at least in part on the type of the utility meter; and providing the determined locations to the OCR algorithm for use in a text-detection process.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method of detecting and recognizing text associated with a meter, comprising:
    receiving, from an imaging device, a first image depicting information displayed by the meter;
    assessing a quality of the first image;
    adjusting a setting of the imaging device to result in an adjusted setting, wherein the adjusting is based at least in part on the assessed quality of the first image and a characteristic of an optical character recognition (OCR) algorithm;
    recognizing a type of the meter in the first image;
    repositioning a field of view of the imaging device to locate a display screen of the meter within the field of view, wherein the field of view is a sub-image of the first image, wherein the field of view contains less area requiring text-detection than the first image, and wherein the repositioning is performed based at least in part on factors comprising:
        the type of the meter; and
        a location of the display screen on the meter based on the type of the meter;
    capturing a second image, depicting the information displayed by the meter in the field of view, using the imaging device set according to the adjusted setting;
    applying the OCR algorithm to the second image to obtain an alphanumeric value associated with the second image;
    obtaining the alphanumeric value from the OCR algorithm;
    obtaining an input typed by a user, wherein the input expresses a current consumption value shown by the meter;
    comparing the input expressing the current consumption value to the alphanumeric value from the OCR algorithm; and
    prompting the user to enter a second input if the input and alphanumeric value differ.

2. The method of claim 1, wherein the characteristic of the OCR algorithm comprises at least one of:
    a degree of illumination of the meter by the imaging device required by the OCR algorithm to successfully recognize characters; or
    an amount of reflected glare that the OCR algorithm can tolerate while still successfully recognizing characters.

3. The method of claim 1, additionally comprising:
    obtaining an earlier meter-reading value; and
    flagging the alphanumeric value if indicated by one or more conditions from among the conditions comprising:
        the alphanumeric value is greater than the earlier meter-reading value by more than a first threshold value; or
        the alphanumeric value is less than the earlier meter-reading value by more than a second threshold value.

4. The method of claim 1, additionally comprising:
    obtaining input typed by a user expressing a value shown by the meter; and
    sending a query to the user if at least one of the following is true:
        a difference between the alphanumeric value and the typed input is greater than a first threshold value; or
        a probability that the alphanumeric value and the typed input are the same is less than a second threshold value.

5. The method of claim 1, additionally comprising:
    recognizing the type of the meter or a serial number of the meter in the first image;
    determining that the type of the meter or the serial number of the meter is not the same as a type of meter shown in an image from an earlier meter-reading; and
    sending a notice of possible fraud or error.

6. The method of claim 1, wherein:
    adjusting settings on the imaging device comprises adjusting settings of a camera of a mobile device; and
    the OCR algorithm comprises:
        executable instructions located in a memory of the mobile device; or
        executable instructions located on a computing device in communication with the mobile device.

7. The method of claim 1, wherein adjusting settings on the imaging device comprises:
    using the second image for a text-detection portion of the OCR algorithm;
    capturing a third image; and
    using a third image for a text-recognition portion of the OCR algorithm;
    wherein a setting used by the imaging device to capture the second image is differently set when the imaging device captures the third image.

8. An application for a mobile device, which performs actions comprising:
- adjusting a setting of a camera of the mobile device, wherein the adjustment is made based at least in part on a characteristic of an optical character recognition (OCR) algorithm;
- capturing a first image of a meter using the camera of the mobile device set according to the adjusted setting;
- recognizing a type of the meter in the first image;
- repositioning a field of view of the camera to locate a display screen of the meter within the field of view, wherein the field of view is a sub-image of the first image, wherein the field of view contains less area requiring text-detection than the first image, and wherein the repositioning is performed based at least in part on factors comprising:
  - the type of the meter; and
  - a location of the display screen on the meter based on the type of the meter;
- capturing a second image, depicting information displayed by the meter in the field of view;
- sending the second image of the meter to the OCR algorithm;
- receiving an alphanumeric value from the OCR algorithm;
- obtaining an input typed by a user, wherein the input expresses a current consumption value shown by the meter;
- comparing the input expressing the current consumption value to the alphanumeric value from the OCR algorithm; and
- prompting the user to enter a second input if the input and alphanumeric value differ.

9. The application as recited in claim 8, wherein the setting is a first setting, and wherein the actions additionally comprise:
- adjusting the setting of the camera of the mobile device by adjusting the setting to a first state for the first image, wherein the first image is used by the OCR algorithm for text-detection; and
- adjusting the setting of the camera of the mobile device to a second state for the second image, wherein the second image is used by the OCR algorithm for text-recognition;
- wherein the first state and the second state are different.

10. The application as recited in claim 8, wherein the actions additionally comprise:
- providing the OCR algorithm with information about a second setting of the camera that was used to create the second image.

11. The application as recited in claim 8, additionally comprising:
- confirming the type of the meter according to a record associated with a customer service site.

12. One or more computer-readable media storing computer-executable instructions that, when executed by one or more processors, configure a computing device to perform acts comprising:
- adjusting a setting of a camera, wherein the adjustment comprises a first setting that is based at least in part on a need of a text-detection portion of an optical character-recognition (OCR) algorithm;
- capturing a first image of a utility meter using the camera set according to the first setting;
- recognizing a type of the utility meter in the first image;
- repositioning a field of view of the camera to locate a display screen of the utility meter within the field of view, wherein the field of view is a sub-image of the first image, wherein the field of view contains less area requiring text-detection than the first image, and wherein the repositioning is performed based at least in part on factors comprising:
  - the type of the utility meter; and
  - a location of the display screen on the utility meter based on the type of the utility meter;
- adjusting a setting of the camera, wherein the adjustment comprises a second setting that is based at least in part on a need of a text-recognition portion of the OCR algorithm, and wherein the first setting and the second setting are different;
- capturing a second image of the utility meter using the camera set according to the second setting and set according to the field of view;
- sending the first image and the second image to the OCR algorithm;
- receiving an alphanumeric value from the OCR algorithm;
- obtaining an input typed by a user, wherein the input expresses a current consumption value shown by a metering device;
- comparing the input expressing the current consumption value to the alphanumeric value from the OCR algorithm; and
- prompting the user to enter a second input if the input and alphanumeric value differ.

13. The one or more computer-readable media as recited in claim 12, wherein the first setting comprises a setting for at least one of zoom, focus or flash.

14. The one or more computer-readable media as recited in claim 12, wherein the acts additionally comprise:
- obtaining at least one characteristic of at least one of the first image and the second image; and
- providing the obtained at least one characteristic to the OCR algorithm.

* * * * *